United States Patent [19]

Cavanagh

[11] Patent Number: 4,810,179
[45] Date of Patent: Mar. 7, 1989

[54] FORCE INDICATOR FOR CASTING MACHINES

[75] Inventor: Kenneth M. Cavanagh, Warwick, R.I.

[73] Assignee: Marshall & Williams Company, Providence, R.I.

[21] Appl. No.: 148,873

[22] Filed: Jan. 27, 1988

[51] Int. Cl.[4] .............................................. B29C 43/24
[52] U.S. Cl. ...................................... 425/141; 264/40.5; 264/175; 425/149; 425/170; 425/367; 425/DIG. 235
[58] Field of Search ............... 425/140, 141, 149, 150, 425/170–172, 328, 367, DIG. 235; 264/40.4, 40.5, 40.7, 175; 73/862.55; 72/199; 241/231

[56] References Cited

U.S. PATENT DOCUMENTS

| | | | |
|---|---|---|---|
| 1,743,302 | 1/1930 | Allen | 425/367 X |
| 2,815,531 | 12/1957 | Stewart | 425/DIG. 235 |
| 2,971,218 | 2/1961 | Bierer | 425/367 X |
| 3,135,018 | 6/1964 | Smith | 425/141 |
| 3,206,009 | 9/1965 | Wahl | 425/DIG. 235 |
| 3,445,070 | 5/1969 | Verdier | 425/DIG. 235 |
| 3,901,635 | 8/1975 | Greenberger | 425/367 X |
| 3,930,774 | 1/1976 | Brand et al. | 264/40.7 X |
| 4,137,025 | 1/1979 | Graves et al. | 264/40.7 X |
| 4,152,380 | 5/1979 | Graves et al. | 264/40.7 X |
| 4,214,857 | 7/1980 | Woeckener et al. | 425/145 X |

Primary Examiner—Richard L. Chiesa
Attorney, Agent, or Firm—Bailey & Hardaway

[57] ABSTRACT

An improvement for casting machines is provided which assures a constant thickness and density of extruded material by varying the speed of nip forming rolls.

7 Claims, 2 Drawing Sheets

FORCE INDICATOR FOR CASTING MACHINES

BACKGROUND OF THE INVENTION

This invention relates generally to the art of plastic film forming extrusion machines and particularly to the maintenance of a constant thickness and density of plastic material being extruded on to a casting drum and the like.

Numerous devices have been developed in an attempt to assure a constant thickness of material emerging from extruders. Most utilize gaging systems to measure the compressed material at some point up-stream from the extrusion rollers. Examples of such devices are disclosed by Brand, et al. in U.S. Pat. No. 3,930,774 and Graves, et al. in U.S. Pat. Nos. 4,137,025 and 4,152,380. The obvious problem with such devices is that the compressed material must be measured as either too thick or too thin before any remedial action can be taken. Also, gaging methods are typically expensive to install and to maintain.

Greenberger, in U.S. Pat. No. 3,901,635 disclosed a control system for briquetters using a position measurement of one roll relative to the other to maintain a constant thickness of compressed material and a pressure measurement of one roll relative to the other to maintain a constant density of compressed material. But, the thickness and density of compressed material have never been calculated and adjusted with only one type of measurement and only one type of adjustment, an easier and more efficient process.

SUMMARY OF THE INVENTION

It is therefore an object of this invention to provide the improvement for extrusion machines of assured constant thickness and density of compressed material.

It is a further object of this invention to regulate the thickness and density of material to be compressed before any material has been extruded at an unacceptable thickness or density level.

It is a further and more particular object of this invention to provide for constant thickness and density of compressed material with only one mechanical adjustment.

These as well as other objects are accomplished in a conventional casting machine by providing means for measuring the force exerted on pivot arms, means for measuring the excess force on corresponding mechanical stops, and means for controlling the size a bank of material feeding into a nip responsive to the difference between the force exerted on one of the pivot arms and the force exerted on a mechanical stop corresponding to said one of the pivot arms.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate an extrusion machine with force transducers to measure the total force exerted on cooperating rolls for signaling a control means to adjust the speed of the rolls in relation to the force on the material.

The present invention offers the ability to detect changes in the size of bank 12 at nip 9. Generally in the art of casting machines, a change in the bank size is indicative of a trend towards either a larger or smaller bank and not simply a finite step change. This trend, if allowed to continue, will ultimately manifest itself as an "out-of-spec" condition in the extruded material, i.e., the extruded material will be too thick or too thin. This invention provides for detection and reversal of any trend toward an "out-of-spec" condition before it becomes detectable in the extruded material. In accordance with this invention it has been found that a relationship exists between bank size and the force exerted on the rolls. It has also been found that bank size can be controlled by regulating the speed of the rolls.

Figure 1:
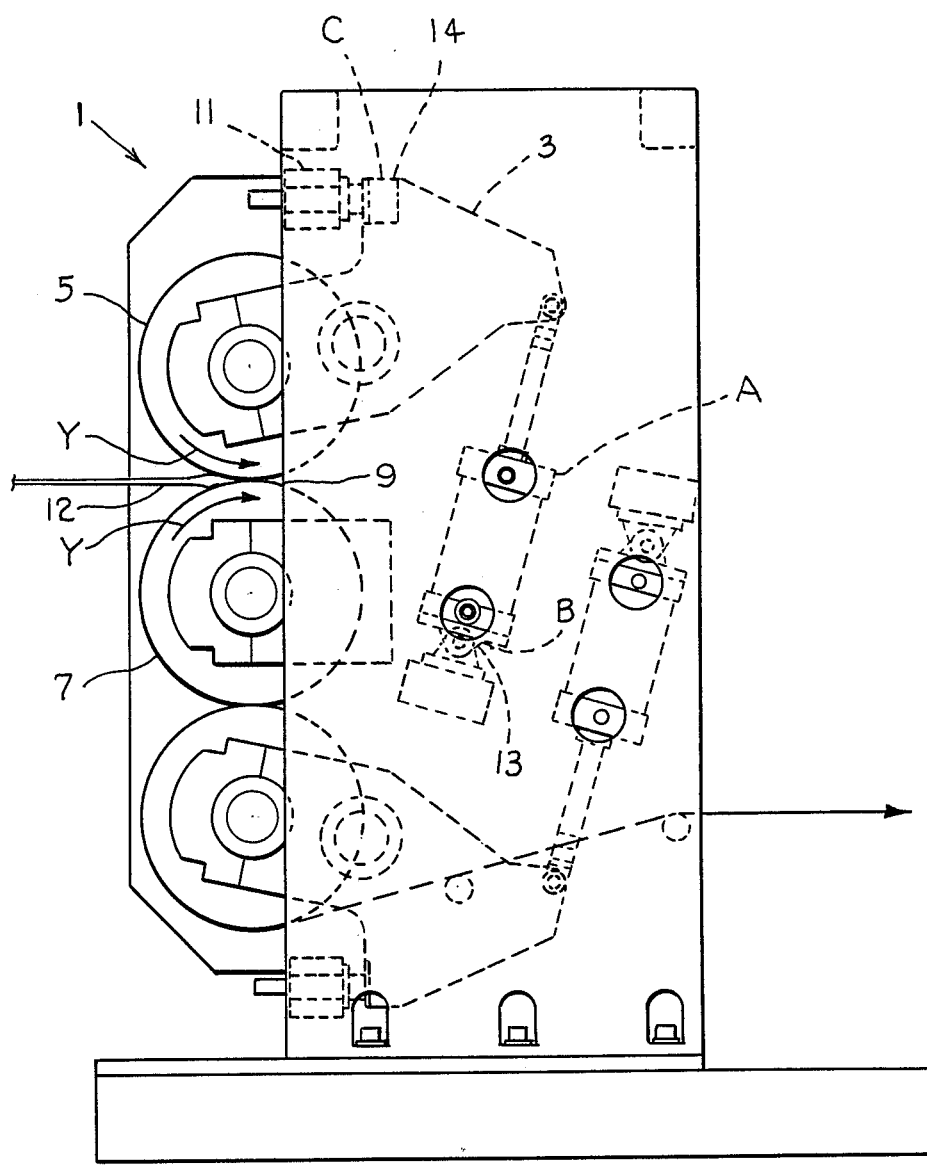
FIG. 1 is a side elevational view illustrating a casting machine with an improvement constructed in accordance with the invention.
Figure 2:
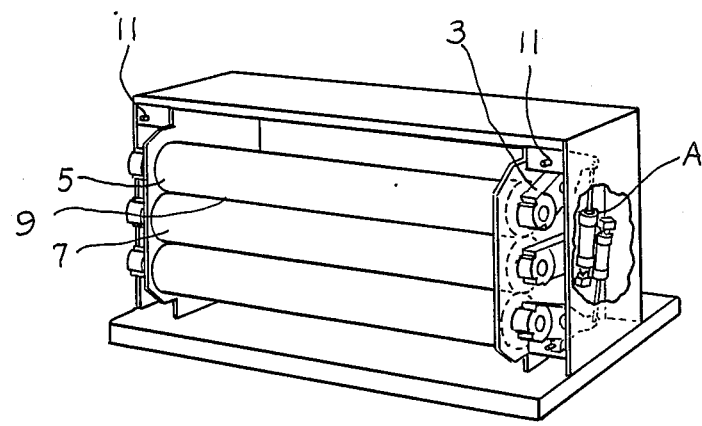
FIG. 2 is a perspective view of a casting machine with the improvement of this invention.

The operating apparatus of the present invention is illustrated in FIGS. 1 and 2 as including pivot arms 3 which apply force to one roll 5 in the direction of the other roll 7, both rolls revolving at speed Y. A nip 9 is defined between the rolls and an adjustable mechanical stop 11 is provided for maintaining a predetermined minimum nip size. Bank 12 of molten material feeds into nip 9 for extrusion. Means A for exerting force on the pivot arm is preferably a fluid cylinder. Force B is the force exerted by that fluid cylinder. Force C is the force exerted by pivot arm 3 on mechanical stop 11. Means for measuring forces B and C are transducers 13 and 14 respectively.

In operation force B pushes roll 5 in the direction of roll 7 exerting a force D, not represented in the drawings, D on roll 5. If force B is great enough to push pivot arm 3 against mechanical stop 11, then excess force C is absorbed by mechanical stop 11. Therefore, if pivot arm 3 is pressed to mechanical stop 11, then force D on the roll 5 equals total force B minus excess force on the stop C. If pivot arm 3 is not pressed to mechanical stop 11, then excess force on the stop 11 equals zero, so force D on the roll 5 equals total force B.

Figure 3:
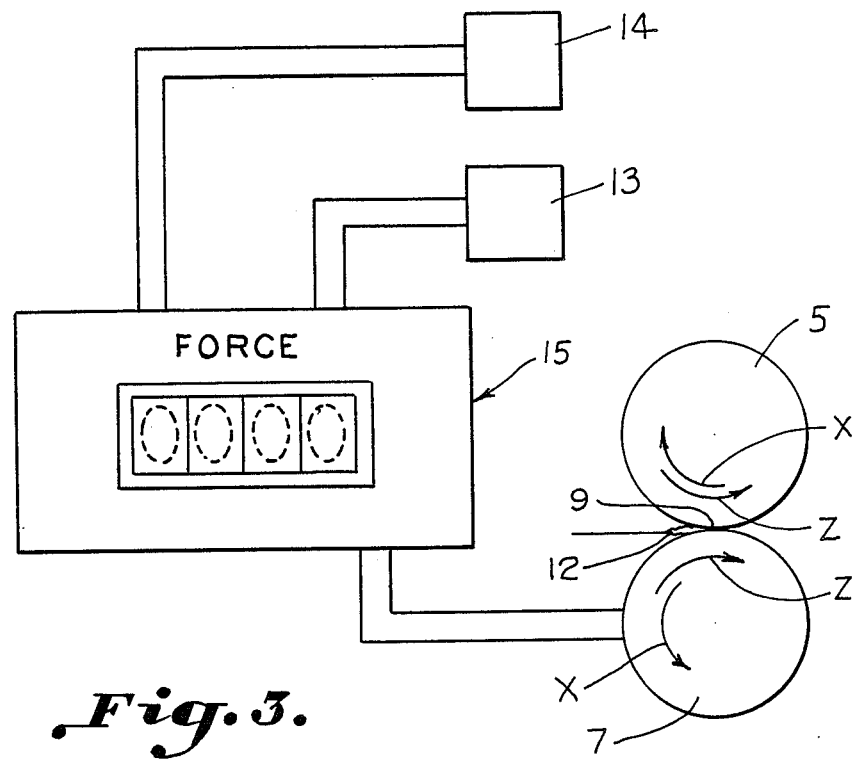
FIG. 3 is a schematic block diagram of the control apparatus constructed in accordance with this invention.

FIG. 3 schematically illustrates electronics module 15 which receives electrical signals representing forces B and C from transducers 13 and 14. Electronics module 15 then calculates the force D on the roll 5 by subtracting the force on the stop 11 from the total force B.

If the calculated force D is not equal to a predetermined ideal force F then electronics module 15 signals rolls 5 and 7 to either speed up or slow down accordingly. If D is greater than F then the rolls are accelerated to some faster speed Z to pull more of molten material 13 through nip gap 9 and accordingly decrease the bank size 12 at the nip 9. If D is less than F then the rolls are slowed to some slower speed by a factor X to pull less molten material 12 through nip 9 and accordingly increase the bank size at the nip. Conversely, increasing the roll speed causes the bank size to decrease.

While a preferred embodiment of the invention has been described using specific terms, such description is for illustrative purposes only, and it is to be understood that changes and variations may be made without departing from the spirit or scope of the following claims.

What is claimed is:

1. In a casting machine having a nip formed by cooperating rolls movable toward and away from each other with means for driving said rolls at variable rates of speed through which material to be compressed is passed, a bank of said material of variable size feeding into said nip, means for varying the size of said bank, a pair of fluid cylinders exerting force on a pair of pivot arms, said pivot arms exerting force on both ends of one of said rolls in the direction of the other of said rolls and exerting excess force on a pair of corresponding adjustable mechanical stops, said mechanical stops blocking said pivot arms for maintaining a predetermined minimum nip distance between said rolls, the improvement comprising:

means for measuring the force exerted on the pivot arms;

means for measuring the excess force exerted on the corresponding mechanical stops;

means for controlling said means for varying the size of said bank responsive to the difference between the force exerted on one of the pivot arms and the force exerted on a mechanical stop, corresponding to said one of the pivot arms, whereby a constant predetermined thickness and density of material emerging from the nip is maintained.

2. The improvement set forth in claim 1 wherein the means for measuring forces are transducers.

3. The improvement set forth in claim 1 wherein a variation in the difference between the force exerted on one of the pivot arms and the force exerted on the mechanical stop corresponding to said one of said pivot arms indicates a directly proportional variation in the size of said bank of material feeding into the nip.

4. The improvement set forth in claim 1 wherein the means for varying the size of said bank is varying the rate of speed of said rolls.

5. In a casting machine having a nip formed by cooperating rolls movable toward and away from each other with means for driving said rolls at variable rates of speed through which material to be compressed is passed, a bank of said material feeding into said nip, means for varying the size of said bank, adjustable mechanical stops for maintaining a predetermined minimum nip distance between said rolls, the improvement comprising:

a pair of spaced power operated pivot arms exerting force on both ends of one of said rolls in the direction of the other of said rolls and exerting excess force on said adjustable mechanical stops;

transducers for measuring the force exerted by said pivot arms and the force exerted on said mechanical stops;

means for controlling the means for driving the rolls responsive to the difference between the force exerted on one of the pivot arms and the force exerted on a mechanical stop corresponding to said one of the pivot arms;

whereby the size of said bank of material feeding into the nip is controlled and a constant predetermined thickness and density of material emerging from the nip is maintained.

6. In a casting machine having a nip formed by cooperating rolls movable toward and away from each other with means for driving said rolls at variable rates of speed through which material to be compressed is passed, a bank of said material feeding into said nip, movable press arms for exerting force on one of said rolls in the direction of the other of said rolls whereby a force is exerted on said material being compressed in the nip, mechanical stops for maintaining a predetermined minimum nip distance between said rolls, the improvement comprising:

means for measuring a total force exerted on one of the arms and a force exerted on a mechanical stop corresponding to said one of the arms; and means for controlling said means for driving the rolls responsive to the difference between the total force exerted on one of the arms and the force exerted on a mechanical stop corresponding to said one of the arms;

whereby a constant predetermined thickness and density of material emerging from the nip is maintained.

7. The improvement set forth in claim 6 wherein the arms for exerting force on one of said rolls in the direction of another are pivot arms.

* * * * *